Dec. 2, 1941.   F. J. GUARINO   2,264,973
APPARATUS FOR HANDLING PLANTS
Filed June 27, 1940

INVENTOR.
FRANCESCO J. GUARINO
BY Bates, Teare, & McBean
ATTORNEYS

Patented Dec. 2, 1941

2,264,973

UNITED STATES PATENT OFFICE 2,264,973

APPARATUS FOR HANDLING PLANTS

Francesco J. Guarino, Bedford, Ohio

Application June 27, 1940, Serial No. 342,753

3 Claims. (Cl. 47—37)

This invention relates to a device for handling plants in predetermined quantities and arrangement for transplanting from place to place as required. The invention is particularly adapted for use in cemeteries for transplanting a bed of plants suitable in size to cover a grave.

In many cemeteries, provision is made on an annual rental basis, for furnishing a bed of ivy or other similar ground cover, but the cost of transplanting the plants individually has made the plan expensive to maintain and has thereby greatly restricted the use of it.

An object of the present invention is to provide a device by means of which an entire bed of plants may be transplanted as a unit from the nursery to a grave, without in any way disturbing the growth of the plant, and for transposing the bed back into the nursery in case of failure to maintain the stipulated annual rental fee.

A further object of my invention is to provide a device which may readily be embedded in the ground and may be concealed by the foliage of the plants contained therein, and which will possess adequate strength to support sufficient earth to maintain adequate plant growth, without the necessity for increasing the size of the container upon enlargement of the plant roots.

A further object of my invention is to make provision for the reception of a flower vase within the confines of the plant container, by means of which the vase may be supported and installed without in any way necessitating removal of the container after installation of the bed.

Figure 1:
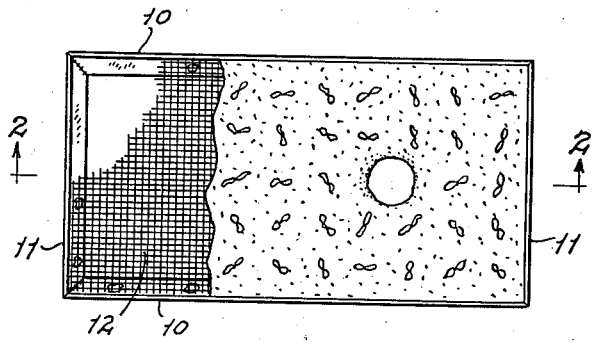
Figure 3:
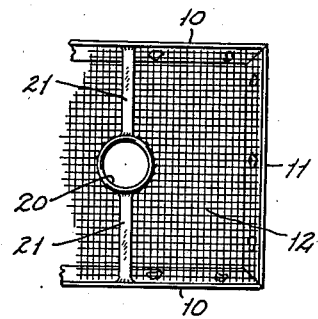
Figure 2:
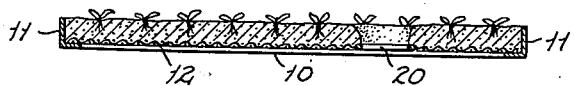
Figure 4:
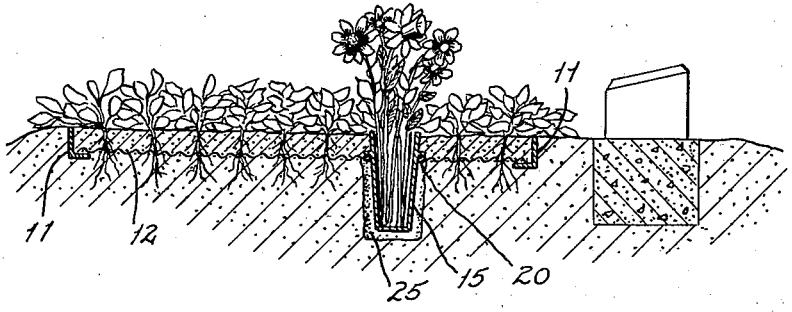

My invention is illustrated in the drawing wherein Fig. 1 is a top plan view of a container made in accordance with my invention and showing a portion thereof filled with plants; Fig. 2 is a section taken on the line 2—2 in Fig. 1; Fig. 3 is a top plan view of a portion of the container and illustrating the vase holder in position thereon, and Fig. 4 is a sectional view showing the invention in use.

The container made in accordance with my invention comprises a shallow tray which defines the shape and size of the bed of plants desired. In the form illustrated, the bed is rectangular in shape and accordingly the container comprises a box-like structure open at the top and having longitudinally extending side portions 10 and end portions 11. The portions 10 and 11 preferably comprise metallic angle bars which are rigidly connected together, as by welding, adjacent the corners. All of the angle bars have a vertically extending portion and an inwardly extending portion, and the inwardly extending portions form a continuous support upon which a screen 12 may be fastened. The screen thus forms the bottom of the container and has a size sufficient to support the weight of about four (4) inches of earth without sagging. The screen, moveover, has a mesh sufficiently coarse to permit the plant roots to pass therethrough as the plants increase in size.

To support a flower vase, indicated at 15, I provide an endless member, such as a ring 20 which may be supported by straps 21 that are rigidly attached, as by welding, thereto, and that extend and are fastened to the side portions 10. The screen, which normally would occupy the space defined by the member 20, may be cut away so that the vase may readily be inserted through the ring and be supported thereby. For this purpose, a hole 25 is left beneath the ring 20 when the container is installed, as is shown particularly in Fig. 4. If the vase is not desired, then a piece of screening may be laid over the ring 20 and the space thereabove may be planted in the same manner as any other space within the confines of the container walls.

My invention is advantageous in that plants may be set out in the frame in a nursery until they have reached a size suitable as ground cover for a grave. At such time, all of the plants may be transplanted as a unit, merely by lifting the container from the ground and transposing it to the desired location. This operation interferes in no way with the growth of the plants and provides a greatly improved method of furnishing a bed of ivy on immediate notice.

The invention, by greatly reducing the time required to transpose a bed of plants, has enabled the installation charge to be reduced to the point where it may now be regarded only as a nominal figure.

I claim:

1. A container for a bed of plants comprising an endless frame having a screen supported thereby, and forming a bottom therefor, and having a vase holder also supported thereby, the vase holder being located adjacent the median line of the frame.

2. A container for a bed of plants comprising a frame of generally rectangular shape, having vertical imperforate walls and having an inwardly extending flange adjacent the bottom thereof, a screen supported on the flange, a support for a flower vase, and means extending between said walls for attaching said support to the frame.

3. A container adapted to carry a bed of growing plants, said container having a length and breadth of sufficient size so that the foliage carried thereby may approximately cover a human grave and having less depth than the normal up and down dimension of the root growth of grave-covering plants, said container having an impervious boundary member defining the sides and ends and a screen for covering the bottom, the screen having a mesh large enough to allow the roots to pass through it into the ground beneath.

FRANCESCO J. GUARINO.